Patented May 13, 1952

2,596,101

UNITED STATES PATENT OFFICE 2,596,101

COATING COMPOSITIONS CONTAINING PETROLEUM RESINS

Lee Pritzker, Baltimore, Md.

No Drawing. Application August 16, 1946, Serial No. 691,171

16 Claims. (Cl. 106—24)

This invention relates to coatings, particularly in the nature of paint and roof coating compositions, to components utilizable in such coatings and compositions, to methods of making such components, to methods of making such coatings and compositions, to articles carrying such coatings, to methods of producing the coated articles.

Asphalt and other bituminous materials have been employed in coating compositions, for example, in roof coatings, such roof coatings commonly consisting of straight asphalt applied by heating the asphalt to a liquid condition and spreading or flowing the heated material over the roofing. However, asphalt is unsatisfactory and exhibits many disadvantages in such utilization. As is well known, when cold asphalt becomes hard and brittle and has a tendency to crack and shatter when chilled after it has been applied to the surface. On the other hand, upon being subjected to heat as in the summer or hot zone temperature, it will also soften and run. In either event under both of the conditions enumerated, the roof covering becomes permeable to moisture and is not tight. Such asphalt coating compositions have been modified by addition of solvents in order that they may be applied by spraying or brushing. With the diluted type of coating composition, only a thin coat of asphalt is applied to a roof. But upon being chilled it becomes brittle and hard, checks and cracks, and is generally subject to the disadvantages referred to above.

Considerable work has been done to overcome the bad features of asphalt coatings by the addition of materials to make them more flexible or by chemical means to raise the melting point. Illustrations of such practices to render the asphalt more flexible is represented by the addition of oils, fats, resinous materials, waxes, etc. Illustrations of chemically treating the asphalt is by refluxing, blowing air into it, reacting with coal tar, etc. While it is a general practice to use a bituminous asphalt and to add materials of such nature that will overcome some of the features referred to above, the asphalt coatings still posses undesirable properties as indicated above.

Among the objects of the present invention is the production of new types of compositions that may be used for coating such as paints, etc., and as roof coating, which are free from the disadvantages and difficulties of the asphalt type compositions.

Further objects include the production of compositions of low viscosity temperature susceptibility, that is, which do not change their characteristics materially over the ranges of temperatures found in normal latitudes.

Further objects include the production of components having new value in coating compositions.

Still further objects and advantages of the present invention will appear from the more detailed description set forth below, it being understood that such more detailed description is given by way of explanation and illustration only, and not by way of limitation, since various changes may be made therein by those skilled in the art without departing from the scope and spirit of the present invention.

In accordance with the present invention coating compositions such as paints and roofing coatings are produced using novel types of hydrocarbon resin materials which exhibit very desirable properties for coating compositions, paints, etc. The resins employed desirably as base materials in producing compositions in accordance with the present invention, may be described as tough, rubber-like, resilient resins of petroleum long chain unsaturated hydrocarbons produced by air blowing of the propane precipitated viscous material from propane dewaxed straight cylinder stock of paraffin base petroleum origin. Or more particularly these materials may be described as products produced by taking a straight cylinder stock that is one produced by distillation without substantial heat decomposition, from paraffin base petroleums such as Eastern petroleums containing extremely low asphaltic materials or considered substantially as asphalt-free. A cylinder stock is produced from such paraffin base petroleum by any of the usual methods to give a cylinder oil. Such cylinder stock oil is then subjected to a dewaxing operation by the use of hydrocarbons from ethane to butane, more particularly exemplified by propane which is quite commonly used in dewaxing operations, the treatment being carried out in the usual way at temperatures below about −20° F., the wax being removed and leaving the propane oil fraction. Ordinarily such dewaxing operations are carried out at the indicated temperatures, using approximately 3 parts of solvent to 1 part of oil undergoing treatment, but of course, other ratios may be employed as well as any temperature which enables the dewaxing operation to be carried out, propane dewaxing being particularly referred to as exemplary. Following such dewaxing operation, additional hydrocarbon more particularly propane, is added to increase the amount of propane present to a point where precipitation of high molecular weight hydrocarbons of viscous character naturally occurring in the cylinder oil are precipitated. Propane ratios at this point may be for example, from about 8 of propane to 1 of oil. Such operations are usually carried out above 77° F. and may be at any temperature above that below the critical temperature of the solvent employed. The result is a hydrocarbon viscous material precipitated by propane from the propane dewaxed cylinder stock. This viscous material is then subjected to air blowing at temperatures for example, of from 450 to 575° F. for a length of time sufficient to produce a viscosity and other characteristics in the product as desired, which time may vary from a few to 20 hours and upward at the temperatures indicated. The resulting treatment yields a tough, rubber-like, resilient resin of petroleum long chain hydrocarbons having some unsaturation which may run from about one double bond to 44 to 52 of carbon atoms present. Such materials are particularly valuable for utilization in the present invention and may be produced in various grades having softening points for example, running from 120 to 140° F. up to 300 to 320° F. and corresponding penetrations (measured by the usual conventional standards) running from approximately 163 down to 42 respectively.

Such viscous material may desirably be employed in accordance with the present invention directly without further treatment but if desired, may be further subjected to a phenol extraction to increase its viscosity and decrease its A. P. I. gravity, the phenol extracting certain constituents from the air blown material producing a raffinate having desirable properties for utilization in accordance with the present invention. The phenol extraction may be carried out at any desirable temperature, as for example, from 100 to 200° F. either under anhydrous conditions or in the presence of a small amount of water. Such phenol type extractions are well known in the art as applied to other materials and are utilized herein for purposes of removing certain constituents from the air blown viscous material referred to above. The product at this stage may be referred to as produced by phenol extraction of the air blown product referred to above and may have characteristics as to softening point penetration, etc. still within the scope of that set forth above for the viscous material but any given product will be modified along lines indicated by such phenol extraction. As exemplary of a material of specific characteristics that may be utilized in accordance with the present invention, the following is given:

| | |
|---|---|
| Softening point (R & B) A. S. T. M.: E28–42T, ° F | 250 |
| Needle Penetration A. S. T. M.: D5–25 | |
| 100 gms., 5 secs., 32° F | 20 |
| 200 gms., 60 secs., 32° F | 45 |
| 100 gms., 5 secs., 77° F | 50 |
| 100 gms., 5 secs., 115° F | 95 |
| 50 gms., 5 secs., 115° F | 65 |
| Solubility in 88° Baumé petroleum naphtha, per cent | 99.8 |
| Neutralization or acid number (Mg.KOH/gm.) | 0.1 |
| Flash (C. O. C.) ° F | 625 |
| Specific gravity | 0.9659 |

Generally these resins may be used in solution in various non-polar solvents, as for example, mineral spirits, kerosene, naphtha, and other petroleum distillate solvents, and aromatic or chlorinated solvents, such as benzene, toluene, trichlor ethylene, carbon tetrachloride, etc. The resins are particularly valuable for use in coating compositions because of their ready solubility in low cost solvents as indicated, and also because of the properties of the resulting coatings based on such resins. They do not vary substantially in viscosity over wide temperature ranges, they do not become hard and brittle at temperatures as low as −60° C. and in many instances will not soften and run at temperatures as high as 200 to 300° F. When modified by the addition of solvents they may be applied by spraying or brushing and produce films that are very flexible and durable, will not crack or become brittle at low temperatures. They do not oxidize or harden in any undesirable way, and therefore, form an excellent basis for coating compositions, particularly for roofing materials where low cost products are desirable.

In utilizing such resins in the production of coating compositions, they are desirably dissolved in a suitable volatile solvent as set forth above, the proportions of solvent to resin varying widely. Any amount of solvent may be utilized that is satisfactory for the purposes in hand depending on the manner in which the application is to be made and the other ingredients to be incorporated. A 50% solution by weight of the specific resin described above in mineral spirits is satisfactory for utilization as a base material for coatings. Where concentrations of this order are employed, however, and in any event where the amount of such solvent present is that which would give a gel-type material with the resin, as is true in the 50% solution referred to, there is desirably incorporated a polar solvent which will make the composition fluid enough for painting or other application. Such polar solvent may be any desired material such as diacetone alcohol, furfural, alcohol such as butyl alcohol, ethyl alcohol, glycols and glycol ethers such as butyl Cellosolve, a rosin solution in spirits, etc.

The amount of polar solvent should be sufficient to give the desired fluidity to the composition but insufficient to reduce the desired solubility of the resin in the non-polar solvent. The ratio of solvents for these purposes may be from 5:1 to 10:1 of non-polar to polar solvent. A preferred ratio is 9:1.

Any desired pigments such as those commonly employed as roofing pigments, namely, red, green, etc., such as Venetian red, may be employed in the composition to produce the desired color. Or aluminum may be added to such compositions either as aluminum paste or as the powders aluminum available on the market. Typical of aluminum pastes are those which carry aluminum powder in mineral spirits, as for example, 65% of aluminum polished powder to 35% spirits. The amount of aluminum or of aluminum paste added to the coating composition or roofing paint may vary within any desirable limits, 1 to 2 pounds of aluminum paste of the 65:35 ratio referred to above being capable of being used, for example, per gallon of the finished product. Where straight aluminum powder is employed, the relative proportions of powder based on the proportions indicated above for the paste may be employed.

Fillers of any desired type may be incorporated, as for example, the usual fillers employed in roofing compositions which may be referred to as roofing fillers including, for example, asbestos fiber or any other fibrating filler for the roofing coating compositions, or mica and other types of fillers may be employed.

To exemplify a roof coating composition, the following formulation is given to make 100 gallons of roof coating:

|  | Pounds |
|---|---|
| Aluminum paste (as above) | 175 |
| Asbestos fiber | 50 |
| Resin solution | 700 |

The resin solution is desirably a solution containing 50% resin by weight in a mixed solvent containing non-polar to polar components in the ratio of 9:1, i. e., mineral spirits and diacetone alcohol.

The ingredients may be mixed in any desirable way and the final product is an excellent roof coating of low cost. In lieu of the aluminum paste, other pigments can be utilized, as for example, Venetian red in an amount of from ½ to 3 pounds per gallon for example. The amount of asbestos fiber in compositions of the character as set forth above or of other filler, may vary from none present where a non-fibrated material is desired, up to 25%, from 1 to 25% being indicated for general purposes where such filler is employed.

These compositions have very excellent properties for roof coating. They withstand extreme temperature ranges without substantial change in their resilience and flexibility, do not become brittle and crack or check at low temperatures, and are non-flowing at relatively high temperatures. They also exhibit a greater brightness than other aluminum bituminous compositions on the market, and on weathering, the brightness of the aluminum increases. Furthermore, it is noteworthy that the aluminum does not leaf as much in compositions produced in accordance with the present invention as in the prior art asphalt type compositions, and there is no tendency for the aluminum to float to the surface with changes in softness of the composition that results in the asphalt type materials previously on the market.

Compositions produced with the resins and solvents of the present invention have particular utility as low cost paints of very desirable properties for purposes other than roof coatings. And any of the compositions produced as set forth above may be utilized for such further purposes. However, both for coating compositions generally and for improvement in roof coatings, it is desirable to modify the compositions by the inclusion of a drying oil such as wood oil or oiticica oil. These particular oils have remarkable effects on the characteristics of the resins present in these coating compositions produced in accordance with the present invention as relatively small amounts of such oils give unusual properties to the resulting films. Very flexible films are produced which dry to insoluble non-bleeding films, the flexibility being far beyond what would normally be expected from the relatively low amounts of oil that can be utilized for producing such compositions. The differences are also illustrated by the fact that the kauri reduction factor of 200% may be produced utilizing as little as 20% of oil or less in the compositions. The amount of oil added to the composition may vary within substantial limits, but to produce the best results in giving films which dry to insoluble coatings, it is best to use not less than 10% of oil based on the weight of resin present and up to 20% which is the preferred upper limit although amounts up to 50% may be employed. The oil has the unique effect on such resins of making them dry to non-bleeding films. Without the oil, the resin produces a film which is still soluble and if second coats are to be applied thereover solvents in the second coat would dissolve the initial coat. By the incorporation of the oil into the resin composition, upon drying the resulting film is insoluble even though as low as 10% oil is present in the composition.

The composite of resin plus oil produced in accordance with the present invention really acts as a new type of resin having its own plasticizing effect and requires no added plasticizer to produce the desired flexibility and resiliency in the films obtained. In fact such resin-oil complex produced in accordance with the present invention may be utilized as a plasticizer or film former in other types of paints, as for example, in linseed oil paints. As explained above, the resulting compositions in which the oil modified resin is employed, can be pigmented in any desired way, as for example, with red and green pigments, aluminum pastes and aluminum powders, etc. Any of the compositions set forth above may be employed with the oil modified resin and an example of producing a coating composition is given below for the production of 100 gallons as follows:

|  | Pounds |
|---|---|
| Venetian red | 300 |
| Resin solution | 650 |
| China-wood oil | 75 |

Any of the usual driers such as cobalt, lead, manganese and zinc naphthenates, etc. may be incorporated into the composition in the usual amounts. The resin solution referred to above may be the same as that previously described including 100 pounds of resin, 90 pounds mineral spirits, 10 pounds diacetone alcohol. Further as explained above, other polar solvents than diacetone alcohol may be utilized selected from any of the stated components or other polar solvents described above, and other types of solvents than mineral spirits may be employed in producing these compositions. The compositions produced in the proportions set forth above may be compounded in any desired way. For example, the oil may be introduced into the resin solution and then incorporated with the other ingredients or any other order of mixing the ingredients may be employed.

Having thus set forth my invention, I claim:

1. A coating composition consisting essentially of a tough, rubber-like, resilient resin of petroleum long-chain unsaturated hydrocarbons produced by air blowing at 450 to 575° F. of a propane precipitated viscous material from propane dewaxed straight cylinder stock of paraffin base petroleum origin, a non-polar volatile solvent therefor in an amount which would produce a gel with the resin, and a polar solvent in amount to give the composition paint fluidity.

2. A coating composition consisting essentially of a tough, rubber-like resilient resin of petroleum long-chain unsaturated hydrocarbons produced by phenol extraction at 450 to 575° F. of an air-blown product from a propane precipitated viscous material from propane dewaxed straight cylinder stock of paraffin base petroleum origin, a non-polar volatile solvent therefor in an amount which would produce a gel with the resin, and a polar solvent in amount to give the composition paint fluidity.

3. A composition as set forth in claim 1, in which theh resin constitutes 50% of the composition by weight.

4. A composition as set forth in claim 2, in which the resin constitutes 50% of the composition by weight.

5. A composition as set forth in claim 1, in which the ratio of components is 10:9:1.

6. A composition as set forth in claim 2, in which the ratio of components is 10:9:1.

7. A composition as set forth in claim 1, in which the solvent is mineral spirits, the polar solvent is diacetone alcohol, and the components are present in the ratio of 10:9:1 by weight.

8. A composition as set forth in claim 2, in which the solvent is mineral spirits, the polar solvent is diacetone alcohol, and the components are present in the ratio of 10:9:1 by weight.

9. A composition as set forth in claim 1 together with aluminum paste as a pigmenting composition in the amount from 1 to 2 pounds per gallon of finished product.

10. A composition as set forth in claim 1 which includes from 1 to 25% by weight of a filler based on the weight of the composition containing filler.

11. A composition as set forth in claim 1 which includes aluminum paste in the amount of from 1 to 2 pounds per gallon of finished product, and from 1 to 25% by weight of filler based on the weight of the composition containing filler.

12. A composition as set forth in claim 1 in which the volatile solvent is mineral spirits, the polar solvent is diacetone alcohol, and the components are present in the ratio of 10:9:1 by weight, the composition also including aluminum paste in an amount of from 1 to 2 pounds per gallon.

13. A composition as set forth in claim 1 which includes a drying oil selected from the group consisting of wood and oiticica oils in an amount of from 10-50% by weight of the composition.

14. A composition as set forth in claim 2 which includes a drying oil selected from the group consisting of wood and oiticica oils in an amount of from 10 to 50% by weight of the composition.

15. A composition as set forth in claim 1, in which the components are present in the ratio of 10:9:1 by weight, and also including from 10 to 20% by weight of a drying oil selected from the group consisting of wood and oiticica oils.

16. A composition as set forth in claim 1, in which the volatile solvent is mineral spirits, the polar solvent is diacetone alcohol, and the components are present in the ratio of 10:9:1 by weight, together with 20% by weight of a drying oil selected from the group consisting of wood and oiticica oils.

LEE PRITZKER.

REFERENCES CITED

The following references are of record in the file of this patent:

UNITED STATES PATENTS

| Number | Name | Date |
|---|---|---|
| 2,063,669 | Ford | Dec. 8, 1936 |
| 2,102,957 | Kaufier et al. | Dec. 21, 1937 |
| 2,123,247 | Laurence et al. | July 12, 1938 |
| 2,255,825 | Skeen | Sept. 16, 1941 |
| 2,337,336 | McCluer et al. | Dec. 21, 1943 |
| 2,392,497 | O'Neill | Jan. 8, 1946 |
| 2,415,697 | Krowles et al. | Feb. 11, 1947 |